UNITED STATES PATENT OFFICE.

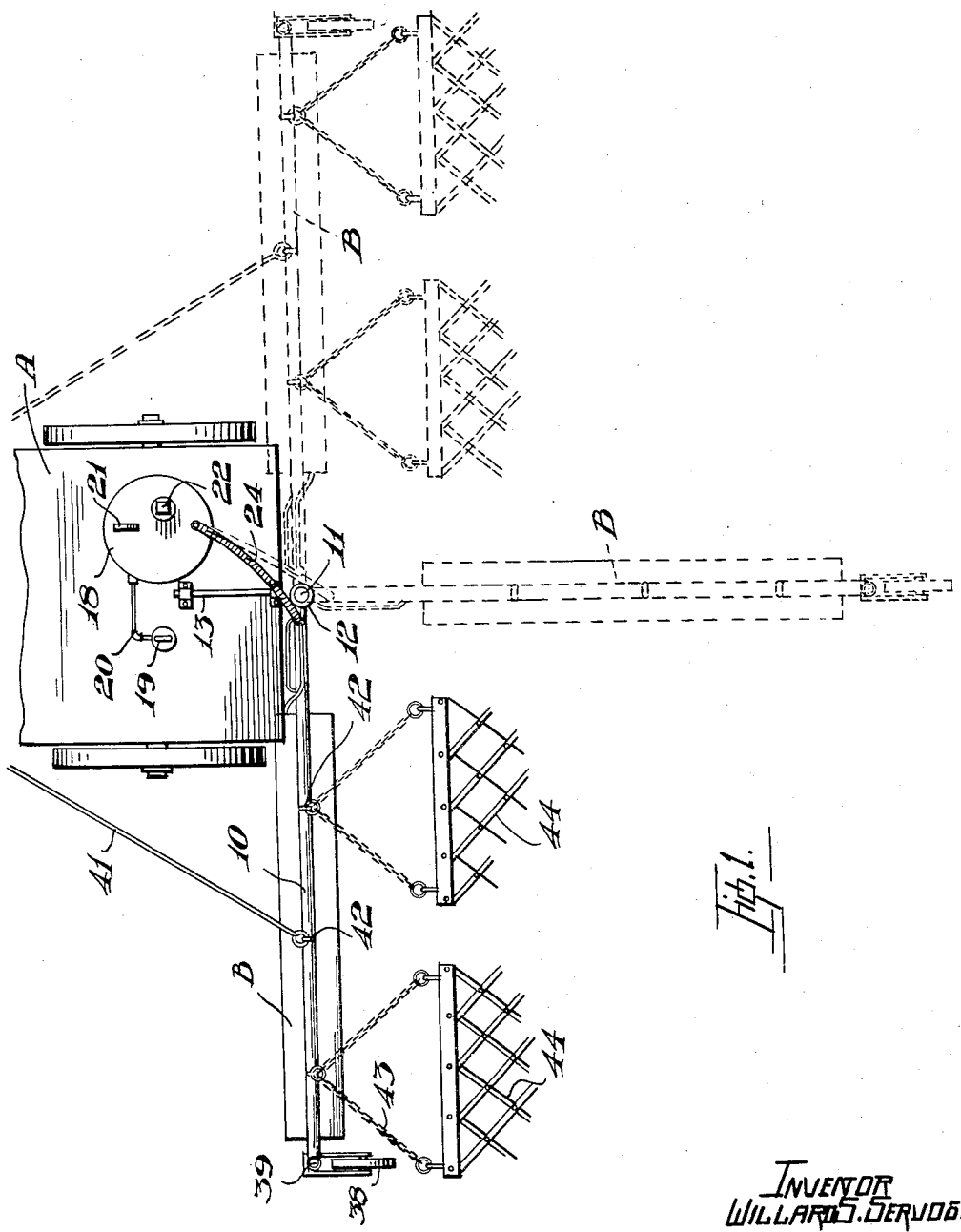

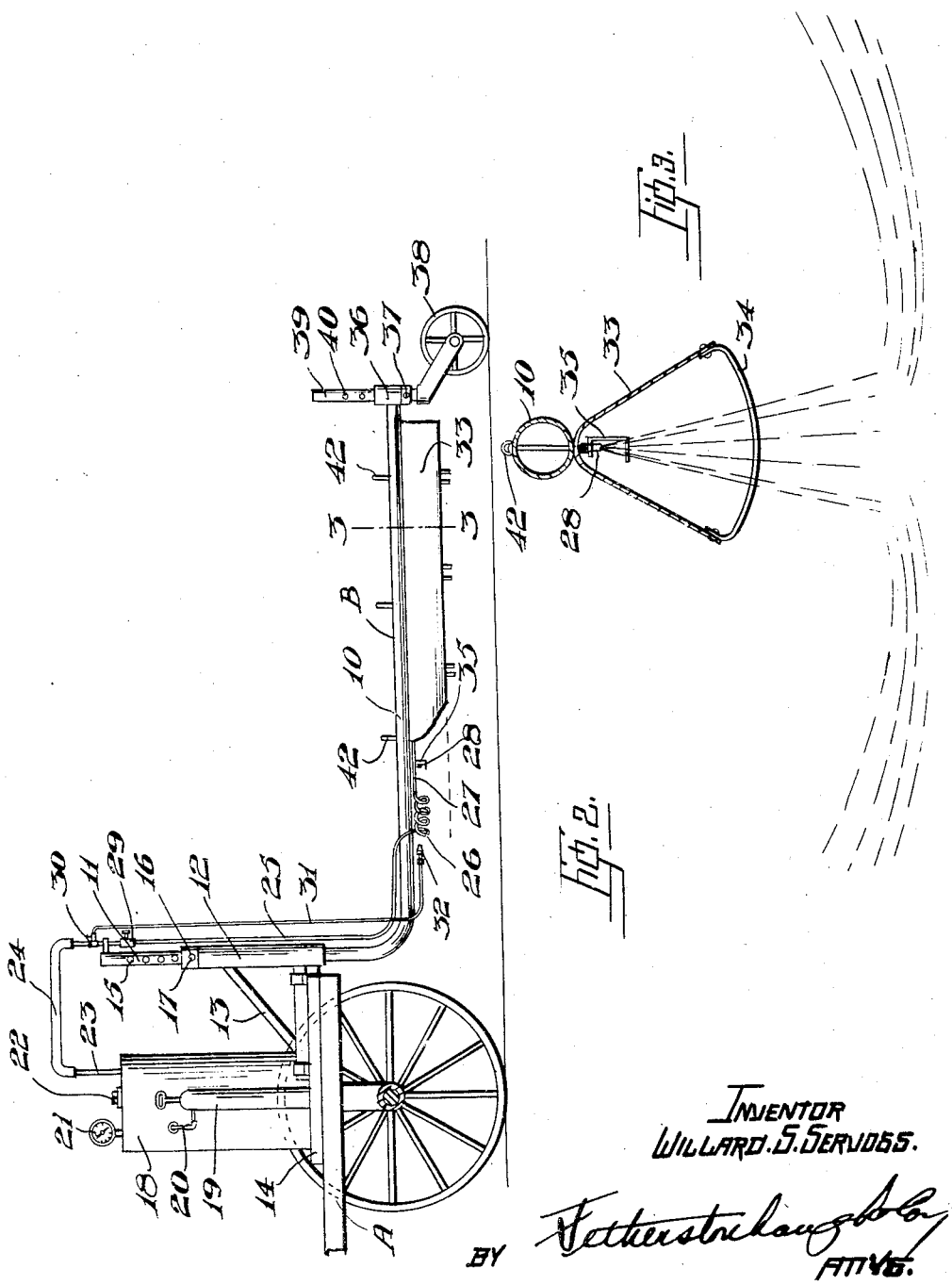

WILLARD STRAIT SERVOSS, OF BRIERCREST, SASKATCHEWAN, CANADA.

WEED BURNER AND ERADICATOR.

1,399,229.  Specification of Letters Patent.  Patented Dec. 6, 1921.

Application filed March 5, 1921. Serial No. 450,066.

*To all whom it may concern:*

Be it known that I, WILLARD STRAIT SERVOSS, a citizen of the United States of America, and resident of Briercrest, in the Province of Saskatchewan, Dominion of Canada, have invented certain new and useful Improvements in Weed Burners and Eradicators, of which the following is a specification.

This invention relates to weed burners and eradicators, and has for its objects to destroy the wild oats and weeds of all kinds and clearing a field of any growth which is detrimental to the raising of good crops, to so control the flame that it may be kept in contact with the weeds long enough to perform the function desired, to provide a burner with a device to feed atomized fuel to the distributing pipe thereof, and generally to adapt the several parts to better perform the functions required of them.

The invention consists essentially of the improved construction particularly described and set forth in the following specification and accompanying drawings forming part of the same.

In the drawings;

Figure 1 is a plan view of a part of the vehicle with the weed burner attached thereto.

Fig. 2 is a side elevation of the same.

Fig. 3 is a vertical section taken on the line 3—3 of Fig. 2.

In the drawings, like characters of reference indicate corresponding parts in the several figures.

Referring to the drawings, A represents a vehicle of usual construction, and B the weed burner comprising a frame 10 curved upwardly to provide a shank 11 designed to be engaged by a sleeve 12 rigidly carried by a bracket 13 fastened to a platform 14 which may be placed on a vehicle A of any description.

The shank 11 of the frame is provided with a plurality of orifices 15 and the sleeve 12 has a collar perforated at 16 and provided with a pin 17 designed to engage the orifices 15 and 16, thus providing means of adjusting the frame 10 to the desired height.

The platform 14 also carries a tank 18 for any liquid fuel such as gasolene, kerosene or alcohol.

The pump 19 is also carried by the platform 14 and has a connection 20 with the top of the tank 18 and is designed to feed air into the tank 18 for a purpose that will hereinafter be described.

A gage 21 is provided on the tank 18 to measure the air pressure fed by the pump 19 and an opening 22 is provided on top of the tank whereby the fuel can be fed therein.

A pipe 23 extends approximately to the bottom of the tank and is provided on its outward projection with a flexible connection 24 leading to a tube 25 extending downwardly to the heating coil 26 and to a distributing pipe 27.

The distributing pipe 27 is provided with a plurality of jets 28 and the said distributing pipe extends along and is carried by the frame 10. The tube 25 is provided with a shut-off valve 29 and above this valve section a shut-off valve 30 is provided to which is connected a downwardly extending tube 31 provided at its lower end with a jet 32 located in close proximity with the heating coil 26.

When in use the shut-off valve 29 is closed and the valve 30 opened and air is pumped from the pump 19 to the tank 18 so that the fuel is caused by air pressure to ascend the pipe 23 and runs along the flexible connection 24 down the tube 31 to the jet 32 where it is lighted in order to heat the coil 26 previous to the fuel being fed into the distributing pipe 28, and in order to atomize the fuel subsequently fed thereto.

The distributing pipe 27 is provided with a hood 33 having two walls extending downwardly and to which are connected guard rails 34 below each of the jets 28 in order to guard the same from the weeds on the soil.

The jets 28 are also provided with cross wires 35 which will be heated by the burning fuel ejected from the jet 28 so that these cross wires may help in sustaining the kindling temperature in order that the flame will not be extinguished.

The outer end of the frame 10 is formed with a sleeve 36 provided with a pin 37 and a caster wheel 38 having a swivel shank 39 provided with a plurality of orifices 40. The swivel shank 39 slidably fits into the sleeve 36, and the pin 37 is designed to engage the orifices 40 so that the frame 10 may be carried at the desired height.

When using the weed burner it is carried as shown in Fig. 1 either to the left or the right of the operator and is hitched in position by the rod 41 carried by the vehicle and connected to the frame 10 by means of the eyes 42 provided thereon.

The shut-off valve 29 is then closed, while the valve 30 is opened and the air fed from the pump feeds the fuel through the pipe 24 down to the tube 31 where it is lighted on its outlet from the jet 32 in order to heat the coil 26. The valve 29 is then turned open and the fuel allowed to run along the tube 25 into the heating coil 26 where it will be atomized, previous to being fed to the distributing pipe 27 and to the jets 28 where it will be lighted and the jet as shown in Fig. 3 will have sufficient force to spread on its contact with the ground and be able to burn weeds on a relatively large area adjacent to the line where the jet impinges.

It will be seen that great economy is obtained as no flame is consumed unnecessarily, passing through the air, but all combustion of fuel is carried out at the weed or stubble roots, thus utilizing the igniting qualities of every particle of the flame against the material to be ignited.

The eyes 42 not engaged by the hitching arm 41 may be engaged by the chains 43 carrying drags 44 which will engage the roots burned by the flame from the jets 28 and drag them, thus performing the function of harrows.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. A weed eradicator, in combination with a vehicle, and comprising a platform on the vehicle, a bracket on the platform, a frame slidably and hingedly carried by the bracket and a caster-wheel at the outer end of the frame, a fuel tank on the platform, a distributing pipe carried by the frame, a plurality of jets on the distributing pipe, pipe connections between the tank and the distributing pipe, means to feed the fuel to the distributing pipe and means to atomize the fuel.

2. A weed eradicator, in combination with a vehicle, comprising a platform on the vehicle, a bracket on the platform, a sleeve carried by the platform, a frame having a caster-wheel at one end, the other end of the frame being provided with an upwardly extending shank having orifices therethrough and designed to slidably engage the said sleeve, a pin on the sleeve adapted to engage one of the orifices, a fuel tank on the platform, a burner carried by the frame, and pipe connections between the tank and the burner.

3. A weed eradicator, in combination with a vehicle, comprising a platform on the vehicle, a bracket on the platform, a frame slidably and hingedly carried by the bracket, and a caster-wheel at the outer end of the frame, a rod carried by the vehicle and hitched to the frame for the purpose of fastening the frame in angular position relatively to the vehicle, a fuel tank on the platform, a burner carried by the frame, and pipe connections between the tank and the burner.

In witness whereof I have hereunto set my hand in the presence of two witnesses.

WILLARD STRAIT SERVOSS.

Witnesses:
AUDREY KNUTTON,
W. A. BEYNON.